Jan. 13, 1959
M. MALLORY
2,867,975
STEAM ENGINE
Filed Oct. 26, 1953
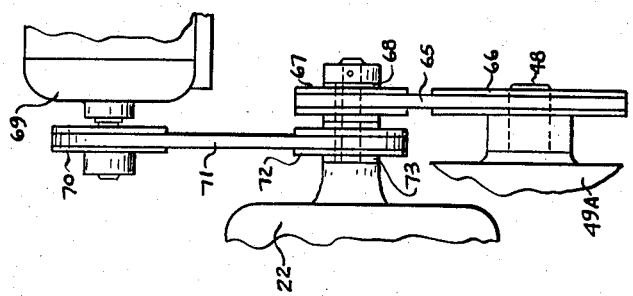
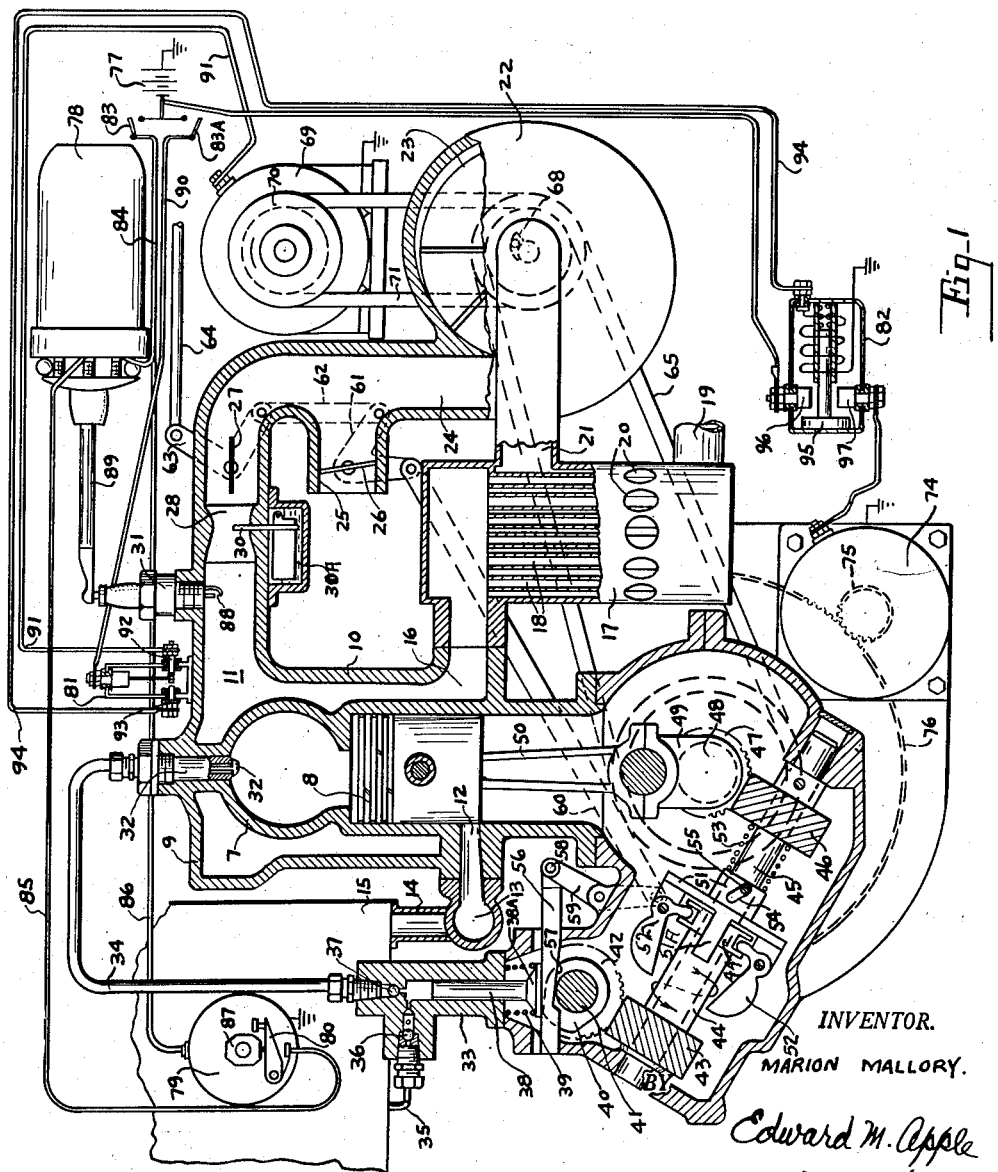
INVENTOR.
MARION MALLORY.
BY Edward M. Apple
ATTORNEY.

United States Patent Office 2,867,975
Patented Jan. 13, 1959

2,867,975

STEAM ENGINE

Marion Mallory, Detroit, Mich.

Application October 26, 1953, Serial No. 388,124

6 Claims. (Cl. 60—27)

This invention relates to steam engines of the reciprocating piston type, and has particular reference to a two cycle steam engine in which the steam is generated inside of the work cylinder by injecting water under high pressure directly into the cylinder over the piston.

An object of the invention is to generally improve devices of the character indicated and to provide an engine which has many of the individual advantages of a steam engine, and of a two cycle internal combustion engine, particularly a diesel engine, without their attendant disadvantages.

Another object of the invention is to provide an engine of the character indicated, which has a high thermal efficiency and great torque.

Another object of the invention is to provide a steam engine which is constructed and arranged with the view of obviating the use of steam boilers, steam pipes, steam storage areas, drive rods, cross heads, guides and other elements now used in conventional steam engines, whereby heat loss, the friction of heavy moving mechanical parts, and the friction of moving steam through long pipes are reduced to a minimum.

Another object of the invention is to provide a steam engine of the two cycle type, which utilizes a continuous heat source for generating steam, whereby heat is developed and stored inside the engine cylinder on the non-power or compression stroke, for effective work on the power stroke.

Another object of the invention is to provide a self-contained steam engine with a minimum of reciprocating mass, which has the same crank case design, lubricating facilities and other features of a two cycle internal combustion engine.

Another object of the invention is to provide an extremely safe steam engine, which is constructed and arranged to develop a continuous and increasing pressure in the work cylinder during the power stroke, which pressure is relieved near the end of each power stroke, whereby any possibility of explosion in the steam system is obviated.

Another object of the invention is to provide a self-contained steam engine, in which a continuous major expansion of the steam is effected in the work cylinder on the power stroke, which major expansion is terminated near the end of each power stroke, and any steam remaining in the cylinder after the termination of the major expansion is compressed and pre-heated on the non-power stroke, whereby a cushioning action takes place, to protect the cylinder walls and to effect a smooth running engine, and to maintain the cylinder in a properly heated condition.

Another object of the invention is to provide a steam engine in which water is instantaneously vaporized inside the work cylinder, whereby the surface tension of the water particles is minimized and any tendency of wet steam friction being developed in the cylinder is obviated.

Another object of the invention is to provide a self-contained steam engine, which will function under load with a quiet exhaust, and which provides a long, tortuous, and rapid travel for the intensely hot gases around the cylinder, whereby steam is generated and superheated throughout the major portion of the power stroke of the piston.

Another object of the invention is to provide a steam engine, with common means for simultaneously controlling the heating medium and the volume of steam generated, whereby there is always a definite relation between the temperature of the steam and the steam pressure on the power stroke.

Another object of the invention is to provide a self-contained steam engine, in which the volume of steam generated is in proportion to the load demand of the engine, and the amount of heat developed is in proportion to the amount of steam required.

Another object of the invention is to provide a steam engine of the character indicated, which is constructed and arranged so that the volume of water injected may be increased or decreased as the piston travels downwardly, and the timing of the injections may be advanced or retarded as the output of the engine requires.

Another object of the invention is to provide a steam engine, which is constructed and arranged so that some of the heat used for generating steam is carried from the engine head into the water intake pipe, whereby the water to be injected is pre-heated before it is injected into the work cylinder.

Another object of the invention is to provide a self-contained steam engine, which has the ability to generate steam with greater rapidity than does a conventional flash boiler, except that in the instant device the heating medium is circulated through the equivalent of coils, and the water for the steam is time sprayed onto the walls of the coils which surround the work cylinder.

Another object of the invention is to provide a steam engine with a single acting piston, wherein there is a timed injection of water into the heated cylinder for expansion purposes, which injection continues during the major portion of the power stroke of the piston. This eliminates the steam pumping losses encountered in the conventional steam engine, where the steam has to travel through long and restricted passageways and valves.

Another object of the invention is to provide an engine of the character indicated, which is constructed and arranged with a steam cylinder and a fire chamber, arranged so that the cylinder head and cylinder walls comprise part of the walls of the fire chamber, whereby to reduce to a minimum the heat losses in the steam chamber.

Another object of the invention is to provide an engine of the character indicated, which is constructed and arranged so that heat from the exhaust gases is recaptured for subsequent use in pre-heating the fuel mixture.

Another object of the invention is to provide an engine of the character indicated, which is constructed and arranged so that substantially the only heat loss from the engine results from radiation through the metal parts.

Another object of the invention is to provide an engine of the character indicated, in which water is injected under high pressure into the heated steam cylinder directly behind the piston, whereby the high atomization of the water causes the water to immediately absorb the heat to generate steam.

Another object of the invention is to provide an engine of the character indicated, which is constructed and arranged so that water may be injected under high pressure into the work cylinder, whereby steam is generated immediately at the beginning of the work stroke of the piston, and the generation of the steam continues during approximately 125 degrees of the work cycle of the piston.

Another object of the invention is to provide an engine of the character indicated, which is constructed and arranged so that the injection of water and the generation of heat are simultaneously and automatically throttled, whereby when the power demand of the engine is low, there is a limited amount of water injected and a restricted amount of fire utilized, and as the power demand of the engine is increased, more water is injected and more fire is applied to the engine.

Another object of the invention is to provide an engine of the character indicated, which is constructed and arranged so that the timing of the water injection into the work cylinder may be automatically advanced and retarded.

Another object of the invention is to provide an engine of the character indicated, which functions on a two cycle principle, and is arranged so that water is injected during a substantial portion of the work stroke, and the injection of the water terminates at a point before the opening of the exhaust port, in order to reduce the pressure in the cylinder at the end of the work stroke, and so that a residue of steam remains in the cylinder for compression by the piston on its return stroke.

The foregoing and other objects and advantages of the invention will become more apparent as the description proceeds, reference being made from time to time to the accompanying drawings, in which drawings:

Fig. 1 is a vertical section taken through an engine embodying the invention, with parts broken away and other parts in elevation, in order to show their relation in the combination.

Fig. 2 is a fragmentary elevational view, illustrating the means for driving the blower.

Referring now more particularly to the drawings, it will be understood that in the embodiment herein disclosed, the reference character 7 indicates the wall of a cylinder, in which is arranged to reciprocate a piston 8. Surrounding a substantial portion of the cylinder 7 are walls 9 and 10 which, together with the wall 7, define a fire chamber 11. The fire chamber 11 may either be in the form illustrated, or may be in the form of a continuous coil surrounding the cylinder wall 7, so that the interior of the cylinder 7 is kept hot at all times during the operation of the engine. The walls 9 and 10 of the engine are preferably heat insulated, which insulation is not shown, in order to reduce the radiation of heat. The wall 7 of the cylinder is provided with an exhaust port 12 which communicates, through the passageway 13 and pipe 14, with a steam condenser 15.

The heat chamber 11 communicates, through an exhaust passageway 16, with a heat exchange element 17, which is provided with a plurality of vertical pipes 18, through which the products of combustion pass downwardly and are exhausted through the exhaust pipe 19. Air is drawn through the openings 20 in the heat exchange unit 17 and passes over the exterior of the pipes 18, where it is pre-heated, and is then drawn through the passageway 21, into a blower 22. The blower 22 is driven as hereinafter described. Air entering the blower 22 is forced by the rotor 23 through a passageway 24, into the fire chamber 11. The passageway 24 has a by-pass 25, which opens to atmosphere, which by-pass 25 may be closed by a butterfly valve 26, which is operated by the throttle linkage as hereinafter described. A second butterfly valve 27 is interposed in the passageway 24, and is also connected to the throttle linkage as hereinafter explained.

Positioned between the passageway 24 and the fire chamber 11 is a venturi tube 28, into which is directed the nozzle of a fuel supply 30, which communicates with a fuel reservoir 30A. As air passes through the venturi 28, fuel is drawn through the nozzle 30, whereby the resulting fuel and air mixture is forced into the fire chamber 11, at the mouth of which is positioned a constant spark plug 31 which ignites the fuel and air mixture as it enters the fire chamber 11. It will be noted that the fire chamber 11 surrounds a substantial part of the cylinder 7, so that the cylinder remains hot at all times during the operation of the engine.

Threaded into the head of the cylinder 7 is a spring loaded injector valve 32, through which water is injected into the cylinder 7 from the injector 33, through the water line 34. It also will be noted that the water entering the valve 32 is always pre-heated, because of the position of the valve with respect to the firing chamber 11. Water is drawn from the condenser 15 into the injector 33 through the line 35. Check valves 36 and 37 are positioned in the lines 34 and 35 and are arranged so that the valve 36 is closed and the valve 37 is open during injection of water into the cylinder 7.

The injection of the water is caused by the movement of the plunger 38, which forces the water under a pressure sufficient to open the check valve 37 and the spring backed valve 32. The plunger 38 is spring backed, as at 39, and is actuated by a cam 40 which is rotated by a shaft 41, which is rotated by a gear 42, in turn driven by a gear 43 carried on a collar 44, which is loosely mounted on, and rotatable with, the spindle 45, the latter being rotated by a gear 46 and a gear 47 which is secured to the crank shaft 48 of the engine, the shaft 48 being driven by the crank 49 and the connecting rod 50 of the piston 8. It will be noted that the crank case 49A and the lubricating facilities (not shown) may be similar to those of a conventional internal combustion engine.

The timing of the injection of water by the plunger 38 is effected by the centrifugal governor 51, which is splined to, as at 51A, and rotates with the collar 44, and slides on the spindle 45, and as the weights 52 of the governor 51 are thrown outwardly, the governor 51 is moved downwardly on the spindle 45, against the pressure of the spring 53, at the same time the slot 54 in the governor 51 rides along the driving pin 55, causing the governor 51 and the collar 44, and the gear 43 to rotate slightly on their axes, which in turn effects the timing of the gear 42 and the cam 40. This timing is automatic with the speed of the engine.

The length of travel of the plunger, resulting in the amount of water injected, is effected by the wedge rod 56, which has a tapered section 57, which rides on the shaft 41 beside the cam 40, and under a portion of the plunger head 38A. The rod 56 is pivoted, as at 58, to the linkage 59, 60, 61, 62, and 63, which linkage is actuated by the throttle rod 64. This linkage also controls the butterfly valves 26 and 27.

The rotor 23 of the blower is driven, while the engine is running, by means of a V belt 65, which, in turn, is driven by a pulley 66 carried on the end of the crank shaft 48, and a pulley 67, which is mounted on an over-running clutch 68. The rotor 23 is driven, when the engine is not running, by means of an electric motor 69, a pulley 70, and another pulley 72, which is provided with an over-running clutch 73. The elements just described are arranged so that the blower is initially driven by the motor 69 before the engine is started, and is ultimately driven by the engine itself after the engine is started and has picked up sufficient speed to actuate the over-running clutch.

The engine is preferably started by means of an electric starter 74, which has a pinion 75 which engages the fly wheel ring gear 76, as in conventional practice. The electric starter 74 is connected in to the electric circuit as illustrated in Fig. 1, in which the reference character 77 indicates a storage battery, 78 indicates an ignition coil, 79 indicates an electric motor for driving the circuit breaker 80, 81 indicates a thermostatic switch, 82 indicates a solenoid operated switch, and 83 indicates a manually operated double contact ignition switch, all of the elements having a common ground as illustrated in Fig. 1.

The engine operates as follows:

When the ignition switch 83 is closed, current flows through the wire 84, into the primary winding of the coil 78 and out of the secondary winding of the coil 78, through the wire 85 to the circuit breaker 80. At the same time, the current flows through the wire 86 to the small motor 79 which drives the cam 87 of the circuit breaker 80. This causes sparking between the electrodes 88 of the spark plug 31, inasmuch as the center electrode of the spark plug 31 communicates with the coil 78 through the wire 89. The contact 83A of the switch 83 causes current to flow through the wire 90 to the thermostatic switch 81, which switch is normally closed when the temperature of its bi-metallic element is below a predetermined point. This permits current to flow through the wire 91 to the motor 69, which motor starts the operation of the blower rotor 23, through the V belt 71, and clutch 72 (Fig. 2). The rotation of the rotor 23 of the blower causes air to be drawn in through the openings 20 and through the passageway 21 into the passageway 24, and hence through the venturi tube 28, where the velocity of the air draws fuel out of the nozzle 30 from the fuel reservoir 30A. The resulting fuel and air mixture is ignited by the electric spark at 88, and the hot flame and hot gases enter the fire chamber 11 and surround the cylinder walls 7.

As soon as the temperature in the fire chamber 11 is sufficient to generate steam, the thermostatic switch 81 is actuated in the opposite direction, opening the contacts 92 and closing the contacts 93, permitting current to flow through the wire 94, to the solenoid switch 82. The opening of the contacts 92, of course, interrupts the flow of current to the motor 69. When the solenoid switch 82 is actuated, the plunger 95 is pulled so that the circuit is then closed between the contacts 96 and 97, permitting current to flow to the electric starting motor 74, which rotates the fly wheel 76, and the crank shaft 48 causing reciprocation of the piston 8. The rotation of the crank shaft 48 also actuates the plunger 38 through the gears 42, 43, 46, and 47, and the cam 40. The cam 40 is arranged so that the injection will begin at some point along the upward travel of the piston 8, and is preferably arranged so that the injection of water may commence as much as twenty degrees before the piston reaches dead center, it being understood that the timing of the injection will be predicated upon the speed of the engine. In other words, as the speed of the engine increases, the timing of the injection will be advanced automatically.

Immediately upon the injection of water into the cylinder 7, and, because of the fine atomization of the water as it is injected, steam will be formed in the cylinder 7 instantaneously. The expanding steam starts the piston 8 downwardly on its power stroke, and the water injection continues during approximately one-hundred-thirty-five degrees of its power cycle. In as much as the walls of the cylinder 7 are maintained in a heated condition throughout substantially their entire length, the pressure on the piston 8 will increase as the injection of water continues into the cylinder. The steam pressure will be maintained on the piston 8 even though the area of the steam chamber above the piston increases. The water injection will preferably cease approximately fifteen or twenty degrees before the piston 8 opens the exhaust port 12. Immediately upon the opening of the exhaust port 12, the pressure in the cylinder 7 will be reduced. The steam is exhausted into the condenser 15, where it will again be returned to liquid form for re-use through the water line 35. It will be understood that the cam 40 can be made so that the injection of water into the cylinder 7 may be slow at the start of the power stroke and increases as the piston travels downwardly or vice versa.

The travel of the plunger 38 can also be controlled by the movement of the throttle rod 64, which moves the wedge rod 56 in or out, to govern the travel of the plunger, whereby the amount of water injected can correspondingly be controlled. The movement of the throttle rod 64 also effects the movement of the butterfly valves 26 and 27 to admit more or less air and fuel into the fire chamber 11. It will be noted that when the butterfly valve 27 is in closed position, the butterfly valve 26 will be in open position, so that air will be by-passed from the blower 22, and the amount of fuel drawn into the fire chamber 11 will be reduced. The movement of the butterfly valves 26 and 27 in the opposite direction will effect the opposite result. As the throttle 64 is moved to increase the flow of air and fuel mixture, the wedge lever 56 will correspondingly be moved to increase the amount of water injected and vice versa. As the speed of the engine is increased, the timing of the injection of the water will be correspondingly advanced, as previously indicated.

It will be understood that through the action of the thermostatic switch 81, the starting motor 74 will not turn the crank of the engine until the temperature in the fire chamber 11 is sufficient to generate steam. It will also be understood that the electric motor 69, which operates the blower 22 when the engine is being warmed up, will be de-energized and the blower 22 will then be driven directly by the engine, through the over-running clutch, when the speed of the engine is sufficient to actuate the clutches.

The steam exhaust port 12 is preferably of such size and positioned so that not all of the steam generated on any power stroke will be exhausted, but is arranged so that a small quantity of steam will remain in the cylinder to be recompressed upon the non-power stroke of the piston, all of which helps to maintain the temperature in the steam cylinder and insure the instantaneous generation of steam as the water is injected into the cylinder.

Although I have shown a certain form of fire chamber, and means for producing heat, it will be understood that I do not intend to be limited to such a structure, nor do I intend to be limited in the utilization of a steam condenser in communication with the exhaust port, nor do I intend to be limited in the construction of the heat exchange element shown in communication with the exhaust pipe.

It is also within the contemplation of the invention to provide a positively driven steam exhaust valve, which may be operated by a cam driven by the engine, so that the steam exhaust valve can open on every upward stroke of the piston and close just preceding the injection of the water. The operation of such an arrangement would be substantially the same as hereinabove described.

It will be understood that other modifications may be made in the structure and arrangement of parts, all of which is within the contemplation of the invention, and intended to be covered by the appended claims.

Having described my invention, what I claim and desire to secure by Letters Patent is:

1. An engine comprising a cylinder having a wall, a second wall spaced from said first named cylinder wall, a piston reciprocating in said cylinder, the said walls having a tortuous way therebetween for the introduction of hot combustion gases, combustion means in communication with said passageway, means for injecting water into said cylinder, part of said last named means being arranged to receive heat from said walls, whereby to preheat the water to be injected into said cylinder, and throttle means for controlling the said combustion means and said water injecting means.

2. The structure of claim 1, in which the said passageway for hot gases is substantially co-extensive with the area of travel of the face of said piston in said cylinder, there being an exhaust port in the wall of said cylinder near the extremity of said heat passageway.

3. The structure of claim 1, in which said combustion generating means include a spark ignition system with a spark plug positioned in said passageway, and a variable supply of fuel and air.

4. The structure of claim 1, in which said combustion generating means include a high frequency spark ignition system with a spark plug positioned in said passageway, and a variable supply of fuel and air, there being independent means for initially starting the flow of said fuel and air supplies when said piston is at rest, there being means to render inactive said last named means when the speed of said piston reaches a predetermined point.

5. The structure of claim 1, including means for increasing and decreasing the volume of injection of water into said cylinder upon the acceleration and deceleration of said piston.

6. A steam engine of the character described having a cylinder externally heated by gases of combustion, combustion means for generating gases, a piston reciprocable in said cylinder, means for injecting water into said cylinder for generating steam in said cylinder back of said piston on approximately 135° of the power cycle of said piston, means associated with said combustion means for storing heat in said cylinder on approximately 225° of the non-power cycle of said piston, a firing chamber in communication with a confined space positioned around said cylinder for heating said cylinder, a blower for introducing a fuel mixture to said chamber, means for independently driving said blower when said engine is at rest and driving means for connecting said blower to said engine and disconnecting said other blower driving means, after said engine is running.

References Cited in the file of this patent

UNITED STATES PATENTS

| | | |
|---|---|---|
| 378,663 | Davidson | Feb. 28, 1888 |
| 883,866 | Dean | Apr. 7, 1908 |
| 1,226,500 | Fuehler | May 15, 1917 |
| 1,778,817 | Spiro | Oct. 21, 1930 |
| 2,094,621 | Savage | Oct. 5, 1937 |
| 2,229,643 | De Baufre | Jan. 28, 1941 |
| 2,596,968 | Harris et al. | May 20, 1952 |
| 2,641,905 | Keller | June 16, 1953 |

FOREIGN PATENTS

| | | |
|---|---|---|
| 501,570 | France | Jan. 30, 1920 |
| 209,730 | Germany | May 15, 1909 |
| 310,450 | Germany | Jan. 23, 1919 |
| 143,812 | Great Britain | June 3, 1920 |
| 165,263 | Great Britain | June 30, 1921 |
| 235,061 | Great Britain | June 11, 1925 |
| 243,903 | Switzerland | Feb. 17, 1947 |